United States Patent
Pfeiffer

(10) Patent No.: US 6,740,350 B2
(45) Date of Patent: May 25, 2004

(54) CONFECTIONERY COMPOSITIONS CONTAINING FIBER

(75) Inventor: Eric John Pfeiffer, Newburgh, IN (US)

(73) Assignee: Bristol-Myers Squibb Company, Princeton, NJ (US)

( * ) Notice: Subject to any disclaimer, the term of this patent is extended or adjusted under 35 U.S.C. 154(b) by 0 days.

(21) Appl. No.: 10/096,763

(22) Filed: Mar. 12, 2002

(65) Prior Publication Data

US 2002/0197357 A1 Dec. 26, 2002

Related U.S. Application Data

(60) Provisional application No. 60/275,097, filed on Mar. 12, 2001.

(51) Int. Cl.$^7$ ................................................. A23G 3/00
(52) U.S. Cl. ..................... 426/572; 426/660; 426/195.1; 426/804
(58) Field of Search ............................... 426/572, 660, 426/804; 424/195.1

(56) References Cited

U.S. PATENT DOCUMENTS

| | | | |
|---|---|---|---|
| 3,493,383 A | 2/1970 | Ryan et al. ...................... 99/1 |
| 3,730,735 A | 5/1973 | Rash, Jr. et al. ........... 99/134 R |
| 4,321,263 A | 3/1982 | Powell et al. ................ 424/195 |
| 4,543,262 A | 9/1985 | Michnowski ............... 426/306 |
| 4,582,709 A | 4/1986 | Peters et al. ................... 426/74 |
| 4,610,884 A | 9/1986 | Lewis, III et al. .......... 426/103 |
| 4,647,459 A | 3/1987 | Peters et al. ................. 424/155 |
| 4,692,339 A | 9/1987 | Stetson et al. ................ 426/72 |
| 4,698,232 A | * 10/1987 | Sheu et al. .................. 426/572 |
| 4,753,805 A | 6/1988 | Cherukuri et al. ............. 426/5 |
| 4,786,510 A | 11/1988 | Nakel et al. ................... 426/74 |
| 4,786,518 A | 11/1988 | Nakel et al. ................. 426/531 |
| 4,882,154 A | 11/1989 | Yang et al. .................. 424/440 |
| 4,933,183 A | 6/1990 | Sharma et al. ............... 424/439 |
| 4,950,689 A | 8/1990 | Yang et al. .................. 514/777 |
| 5,013,716 A | 5/1991 | Cherukuri et al. ............. 514/23 |
| 5,057,328 A | 10/1991 | Cherukuri et al. ............. 426/5 |
| 5,073,370 A | 12/1991 | Meer et al. ................ 424/195.1 |
| 5,073,389 A | 12/1991 | Wienecke .................... 426/103 |
| 5,096,492 A | 3/1992 | Fuisz ............................ 106/215 |
| 5,151,274 A | 9/1992 | Saltman et al. .............. 424/630 |
| 5,173,296 A | * 12/1992 | Andre et al. .............. 424/195.1 |
| 5,223,264 A | 6/1993 | Wehling et al. .............. 424/466 |
| 5,238,696 A | 8/1993 | Fuisz .......................... 426/565 |
| 5,258,181 A | * 11/1993 | Cregier et al. ............ 424/195.1 |
| 5,288,508 A | 2/1994 | Fuisz ............................. 426/5 |
| 5,344,664 A | 9/1994 | Fitch et al. .................. 426/631 |
| 5,348,758 A | 9/1994 | Fuisz et al. ................. 426/660 |
| 5,370,881 A | 12/1994 | Fuisz ............................. 426/5 |
| 5,384,148 A | 1/1995 | Lynch et al. ................ 426/632 |
| 5,389,395 A | 2/1995 | Joseph et al. ................. 426/72 |
| 5,447,732 A | 9/1995 | Tanimoto et al. ............. 426/74 |
| 5,454,874 A | 10/1995 | Richards ....................... 127/34 |
| 5,456,932 A | 10/1995 | Fuisz et al. ................. 426/548 |
| 5,464,649 A | 11/1995 | St. John et al. ............. 426/660 |
| 5,476,678 A | * 12/1995 | Walter et al. ............... 426/660 |
| 5,501,865 A | 3/1996 | Zumbe et al. ............... 426/548 |
| 5,503,862 A | 4/1996 | Fuisz .......................... 426/548 |
| 5,516,524 A | 5/1996 | Kais et al. ................... 424/439 |
| 5,516,537 A | 5/1996 | Fuisz .......................... 426/100 |
| 5,549,917 A | 8/1996 | Cherukuri et al. ............ 426/96 |
| 5,556,652 A | 9/1996 | Cherukuri et al. ............. 426/5 |
| 5,571,441 A | 11/1996 | Andon et al. .................. 252/1 |
| 5,578,336 A | 11/1996 | Monte ......................... 426/72 |
| 5,587,198 A | 12/1996 | Cherukuri et al. .......... 426/660 |
| 5,607,716 A | 3/1997 | Doherty et al. ............. 426/660 |
| 5,665,782 A | 9/1997 | Alexander et al. .......... 514/774 |
| 5,710,183 A | 1/1998 | Halow ........................ 514/892 |
| 5,876,774 A | 3/1999 | Nalur et al. ................. 426/302 |
| 6,248,375 B1 | 6/2001 | Gilles et al. .................. 426/72 |

FOREIGN PATENT DOCUMENTS

| | | | | |
|---|---|---|---|---|
| EP | 0515864 A1 | 12/1992 | ............ A23G/1/00 |
| WO | WO 93/02566 A | 2/1993 | ............ A23G/1/00 |
| WO | WO 98/04156 | 2/1998 | ........... A23L/1/236 |

OTHER PUBLICATIONS

Appl, Richard C. "Confectionery Ingredients from Starch." *Food Technology*. Mar. 1991: 148–149.

Blumsohn, A. et al. "The Effect of Calcium Supplementation on the Circadian Rhythm of Bone Resorption." *Journal of Clinical Endocrinology and Metabolism*. 1994. vol. 79. No. 3: 730–735.

Calvo, Mona S. et al. "Circadian Variation in Ionized Calcium and Intact Parathyroid Hormone: Evidence for Sex Differences in Calcium Homeostasis." *Journal of Clinical Endocrinology and Metabolism*. 1991. vol. 72, No. 1: 69–76.

Calvo, Mona S. et al. Molecular Basis and Clinical Application of Biological Markers of Bone Turnover, *Endocrine Reviews*, vol. 17, No. 4. 1996: 333–368.

deMan, John M. *Principles of Food Chemistry*, Second Edition. Guelph, Ontario, Canada. 1990: 143–152, 163–164, 174–180.

Eastell, Richard. "Abnormalities in Circadian Patterns of Bone Resorption and Renal Calcium Conservation in Type I Osteoporosis." *Journal of Clinical Endocrinology and Metabolism*. vol. 74, No. 3. 1992: 487–494.

Eastell, Richard. "Treatment of Postmenopausal Osteoporosis." *The New England Journal of Medicine*. vol. 338, No. 11. Mar. 12, 1998: 736–746.

(List continued on next page.)

*Primary Examiner*—N. Bhat
(74) *Attorney, Agent, or Firm*—Nelson Mullins Riley & Scarborough, LLP

(57) ABSTRACT

Chewy confectionery compositions made from fats, optional proteins, carbohydrates comprising reducing sugars and non-reducing sugars having a ratio of from about 1:0.2 to about 1:1, and one or more dietary fibers. The ingredients are present in the compositions in specific amounts and ratios so that the fiber can be easily incorporated into the confectionery compositions without adversely affecting the stability, feel, and taste of the compositions. Preferably, the composition is a "fiber chew" in the form of a palatable, good tasting, bite-sized confectionery containing the dietary fiber.

31 Claims, No Drawings

OTHER PUBLICATIONS

Elliott, James G. "Functional Candies: Scientific, Marketing and Regulatory Aspects." *The Manufacturing Confectioner*. Dec. 1994: 39–46.

Harris, Norman et al. *A Formulary of Candy Products*. New York. Chemical Publishing Company, Inc. 1991: 69.

Hassager, Christian et al. "Diurnal Variation in Serum Markers of Type I Collagen Synthesis and Degradation in Healthy Premenopausal Women." *Journal of Bone and Mineral Research*. vol. 7, No. 11. 1992: 1307–1311.

Heaney, Robert P. et al. "Absorbability of Calcium Sources: The Limited Role of Solubility." *Calcified Tissue International*. 1990: 300–304.

Horowitz, Michael et al. "Oral Calcium Supresses Biochemical Markers of Bone Resorption in Normal Men." *American Journal of Clinical Nutrition*. 1994: 965–968.

Hurley, Jayne et al. "Candy: Treat . . . or Trick?" *Nutrition Action Healthletter*, Oct. 1997: 7–9.

Hurley, Jayne. "Optimal Calcium Intake." *NIH Concensus Statement*. vol. 12, No. 4, 1994: 1–31.

Izzo, Mark et al. "Using Cellulose Gel and Carrageenan to Lower Fat and Calories in Confections." *Food Technology*. Jul. 1995: 45–49.

Lees, R. and Jackson, E.B. *Sugar Confectionery and Chocolate Manufacture*. ISBN 0 249 44120 9.

Levenson, David I. et al. "A Review of Calcium Preparations." *Nutrition Reviews*. vol. 52, No. 7. 1994: 221–232.

McKane, W. Roland et al. "Role of Calcium Intake in Modulating Age–Related Increases in Parathyroid Function and Bone Resorption." *Journal of Clinical Endocrinology and Metabolism*, vol. 81, No. 5. 1996: 1699–1703.

Minifie, Bernard. "Chocolate, Cocoa and Confectionery." *Science and Technology*. 1989: 788–789.

Nordin, B.E. Christopher. "Calcium and Osteoporosis." *Nutrition*. vol. 13, Nos. 7/8. 1997: 664–686.

O'Brien, Kimberly O. "Combined Calcium and Vitamin D Supplementation Reduces Bone Loss and Fracture Incidence in Older Men and Women." *Nutrition Reviews*. vol. 56, No. 5. May 1998: 148–158.

Prestwood, K.M. et al. "The Effect of a Short Course of Calcium and Vitamin D on Bone Turnover in Older Women." *Osteoporosis International*. 1996: 314–319.

Schlemmer, Annette et al. "Marked Diurnal Variation in Urinary Excretion of Pyridinium Cross–Links in Premenopausal Women." *Journal of Clinical Endocrinology and Metabolism*. vol. 74, No. 3 1992: 476–480.

Sheikh,. Mudassir S. et al. "Role of Vitamin D–dependent and Vitamin D–independent Mechanisms in Absorption of Food Calcium." *Journal of Clinical Investigation*. vol. 81. Jan. 1988: 126–132.

"Special K Takes on New Meaning." *Tufts University Health & Nutrition Letter*. Jul. 1997:1.

Spencer, Stuart C. "How Sweet is the Future? Asian Confectionery Markets." *The Manufacturing Confectioner*. Feb. 1996: 45–57.

*Sugar Confectionery Manufacture* (2nd Edition). Jackson, E.B. Ed. ISBN 0 7514 0197 8.

Troller, John A. *Water Activity and Food*. Academic Press. 1978: 16.

Boeckners Linda. "Dietary Fiber." NebFacts. Mar. 7, 2002. <http://www.ianr.unl.edu/pubs/foods/nf62.htm>.

Anderson, J. et al. "Dietary Fiber." Colorado State University Cooperative Extension. Mar. 7, 2002. <http://www.ext.colostate.edu/pubs/foodnut/09333.html>.

Anderson, Nancy. "The Benefits of Fiber." Emory Report. Mar. 7, 2002. <http://www.emory.edu/EMORY_REPORT/erachive/1996/May/ERmay.6/5_6_96wellness>.

"Constipation." Mar. 7, 2002.<http://www.geocities.com/Heartland/Prairie/6545/constipation.html>.

"Dietary Fiber." Mar. 7, 2002. <http://www.dietsite.com/Diets/EatingWell/Fiber/Dietary%20Fiber.htm>.

"Dietary Fiber." Johns Hopkins Bayview Medical Center. Mar. 7, 2002. <http://www.jhbmc.jhu.edu/cardiology/rehab/fiber.html>.

"Dietary Fiber—Have you had your 35 g. today?" Mar. 7, 2002. <http://www.lowcarbretreat.com/fiber_1.html>.

"Fiber." American Heart Association. Mar. 7, 2002. <http://www.americanheart.org/presenter.jhtml?identifier=4574>.

"Fiber Facts: Soluble Fiber & Heart Disease." American Dietetic Association. Mar. 7, 2002.<http://www.eatright.org/nfs.nfs88.html>.

Finkle, Peter. "Psyllium Husks Fiber." Mar. 7, 2002. <http://yerba.com/psyllium.htm>.

"Health Implications of Dietary Fiber—Position of ADA." American Dietetic Association. Mar. 7, 2002. <http://www.eatright.com/adap1097.html>.

"Helpful Information About Dietary Fiber and Cholesterol—Dietary Fiber Can Be Extremely Important to Good Overall Health." CyberVitamins.com. Mar. 7, 2002. <http://www.cybervitamins.com/fiber.htm>.

"High Fiber." McKinley Health Center Student Affairs/ University of Illinois at Urbana–Champaign. Mar. 7, 2002. <http://www.mckinley.uiuc.edu/health–info/nutrit/hlthdiet/hifiber.html>.

"Learning Center." Fibercon. Mar. 7, 2002. <http://www.fibercon.com/lc.answers.asp>.

"Metamucil Fiber Wafers." Nonprescription Medicines Academy. Mar. 7, 2002. <http://www.nmafaculty.org/products/metamucil_fiber.htm>.

"Nature's Source . . . your best source." "Dietary Fiber." Mar. 7, 2002. <http://www.naturaltechniques.com/dietary_fiber.htm>.

Papazian, Ruth. "Bulking Up Fiber's Healthful Reputation." A Reprint from FDA Consumer Magazine. Mar. 7, 2002. <http://www.pueblo.gsa.gov/cic_text/food/bulkfibr/bulkfibr.htm>.

Phillips, Beth. "More on Dexfenfluramine . . . " Virtual Hospital® the apprentice's assistant™. Mar. 7, 2002. <http://www.vh.org/Providers/Publications/Gastrogram/09.96.G.G.html>.

"Polycarbophil." Jackson Gastroenterology. Mar. 7, 2002. <http://www.gicare.com/pated/polycarbophil.htm>.

"Soluble Fiber: Effect on Lipid and Glycemic Control." Nutrition Pearls. Southwestern The University of Texas Southwestern Medical Center at Dallas. Mar. 7, 2002. <http://www.swmed.edu/naa/pearls/soluble_fiber.htm>.

"Supplements A–Z—Fiber." Supplement Watch. Mar. 7, 2002. <http://www.supplementwatch.com/supatoz/supplement.asp?supplementld=123>.

"Supplements A–Z—Methylcellulose." Supplement Watch. Mar. 7, 2002. <http://www.supplementwatch.com/supatoz/supplement.asp?supplementld=201>.

"Supplements A–Z—Polycarbophil." Supplement Watch. Mar. 7, 2002. <http://www.supplementwatch.com/supatoz/supplement.asp?supplementld=217>.

"Supplements A–Z—Psyllium." Supplement Watch. Mar. 7, 2002. <http://www.supplementwatch.com/supatoz/supplement.asp?supplementld=230>.

Talley, Nicholas J., M.D. "Irritable Bowel Syndrome." *Best Practice of Medicine*. Sep. 2001. Merck Medicus. <http://merck.praxis.md/bpm/bpmtables.asp?page=BPM01GA10&table=BPM01GA10T07>.

"Treatments—Medications Commonly Used in MS." National Multiple Sclerosis Society. Mar. 7, 2002. <http://www.nationalmssociety.org/\Meds–Psyllium.asp>.

* cited by examiner

CONFECTIONERY COMPOSITIONS CONTAINING FIBER

The present application claims the benefit of U.S. Provisional Application Serial No. 60/275,097 filed Mar. 12, 2001, which is incorporated herein by reference thereto.

BACKGROUND OF THE INVENTION

1. Field of the Invention

This invention relates generally to confectionery compositions and particularly to confectionery compositions containing fiber and to methods for preparing such confectionery compositions.

2. Description of Related Art

The prior art is replete with information about confectionery compositions. For example, Harris et al. (A Formulary of Candy Products, 1991, pg. 69) discloses an economy caramel composition and method for making such composition. This caramel contains typical components for a caramel, e.g., fats, carbohydrates, water, non-fat milk solids, and starch. U.S. Pat. No. 4,582,709, issued to Peters et al. on Apr. 15, 1986, discloses pleasant tasting, soft, chewable mineral supplements based upon caramel or nougat confectionery compositions. Troller (Water Activity and Food) discloses confectioneries protected from microbial spoilage by controlling the water activity. The water activity is controlled to prevent microbial spoilage, particularly due to yeast fermentation. U.S. Pat. No. 4,753,805, issued to Cherukuri et al. on Jun. 28, 1988, discloses the use of encapsulated flavorings for chewing gum. U.S. Pat. No. 5,571,441, issued to Andon et al. on Nov. 5, 1996, discloses vitamin supplements containing bracers and flavanols or green tea solids and possibly carbohydrates. U.S. Pat. No. 5,223,264, issued to Wehling et al. on Jun. 29, 1993, discloses the addition of the mineral magnesium phosphate to products as a dietary supplement. None of these confectionery compositions, however, contain fiber as a dietary supplement.

Medical and nutrition professionals generally agree that dietary fiber is essential for good human health. A low intake of dietary fiber is associated with high incidents of several diseases such as heart disease, diabetes, obesity, and colon cancer and is often responsible for intestinal irregularity. Proper intake of dietary fiber benefits the human gastrointestinal tract by stimulating bowel movement, slowing down the gastrointestinal transition and digestion process, modifying fat absorption, and increasing bile acids excretion. Additionally, some dietary fibers are known to lower blood cholesterol and benefit the postprandial glycemic response.

The average person in the United States consumes about 15 grams of dietary fiber per day. Most health professionals recommend a dietary fiber intake of 25 grams for people with a diet of 2,000 calories per day and 30 grams for people with a diet of 3,000 calories per day. Thus, an extra 10 to 15 grams of fiber per day is needed to reach the recommended levels. This can be done by increasing the dietary consumption of grains, fruits, and vegetables but would require the consumer to double the dietary intake of such foods. Many, if not most, consumers have been reluctant to adopt a change in lifestyle required to double their intake of fiber from food, particularly given that many food items are highly processed for convenience and easy preparation and therefore contain less fiber than natural foods.

Consumers often look for supplements to complement their diet when a dietary ingredient such as fiber is lacking. Citrucel® brand of fiber from SmithKline Beecham (http://www.citrucel.com/) contains methylcellulose fiber that is promoted to "help you stay regular without excess gas." The product is sold in varieties that include various fruit flavoring agents, citric acid, sucrose, and other compounds. A sugar-free product contains an artificial sweetener as well as natural fruit flavors. Metamucil® brand of fiber from Procter and Gamble (http://www.metamucil.com/) contains psyllium fiber that is promoted as a product that "may help reduce heart disease risk by lowering cholesterol when part of a heart healthy diet." The product is sold in varieties that include various fruit flavors and other inactives.

The prior art teaches several other methods for supplementing dietary fiber. U.S. Pat. No. 5,073,370, issued to Meer et al. on Dec. 17, 1991, describes a natural fiber laxative containing psyllium husk, apple fiber, fructose, gum arabic, and flavorants. The psyllium husk and the apple fiber comprise at least 75% by weight of the composition. The particle size is controlled to improve palatability. U.S. Pat. No. 5,516,524, issued to Kais et al. on May 14, 1996, claims an ingestible laxative composition comprising specified amounts of dioctyl sulfosuccinate and bulk fiber selected from the group consisting of psyllium, methylcellulose, polycarbophil, calcium polycarbophil, bran, malt soup extract, karaya, guar gum, and mixtures thereof. U.S. Pat. No. 4,321,263 issued to Powell et al. on Mar. 23, 1982, discloses psyllium-based bulk laxatives prepared from powdered husks of psyllium seeds and equal parts of a sugar wetting agent. The compositions are dispersed in water to provide hydrophilic aqueous compositions which adsorb large amounts of water to provide bulk and thus normalize bowel function by improving stool formation. U.S. Pat. No. 5,710,183, issued to Halow on Jan. 20, 1998, discloses a fiber composition containing polyethylene glycol. Polyethylene glycol is used as a wetting agent to promote dispersion in solvents.

Fiber supplements available to consumers such as those discussed herein have generally consisted of inconvenient and unpalatable fiber compositions that must be dissolved in water and drunk or incorporated into food items and eaten. Preparation of the fiber supplements requires mixing fiber powders in water or other liquids and is often messy and inconvenient. The fiber supplements are viscous and taste bad. Because of lack of availability of alternatives, consumers have been forced to use these forms of fiber in spite of the inconvenience and objectionable tastes and textures. Unfortunately, fiber containing confectionery compositions in convenient and palatable forms are not available to supplement the diet. There is, therefore, a need for convenient and palatable dietary fiber compositions that can provide dietary fiber to a consumer.

SUMMARY OF THE INVENTION

It is, therefore, an object of the invention to provide convenient and palatable confectionery compositions containing dietary fiber.

It is another object of the present invention to provide methods for making convenient and palatable confectionery compositions containing dietary fiber.

It is a further object of the invention to provide a method for providing supplementary dietary fiber to a consumer by having the customer consume a convenient and palatable confectionery composition containing fiber.

These and other objects are achieved using novel confectionery compositions containing fiber. The compositions contain confectionery ingredients that make the composition palatable and fiber ingredients that supplement fiber in the diet when the compositions are consumed. The compositions are available to the consumer in convenient, preferably bitesize, forms that can be easily consumed as a supplement. The confectionery ingredients are present in the composition in specific amounts and ratios so that the fiber can be easily incorporated into the composition without adversely affecting the stability, texture, feel, taste, and aftertaste of the composition. Such a composition comprises from about 5 to about 40 wt % of a fiber such as psyllium or mixtures of fibers; from about 3 to about 18 wt % of a fat such as hydrogenated vegetable oil; from about 0 to about 10 wt % of a protein such as whey; from about 40 to about 70 wt % of a carbohydrate comprising at least one reducing sugar such as corn syrup and at least one non-reducing sugar such as sucrose. The reducing sugar and non-reducing sugar are present in a ratio of from about 1:0.2 to about 1:1 (reducing sugar: non-reducing sugar).

In one particular embodiment of the present invention, a confectionery composition comprising a dietary fiber or a mixture of dietary fibers in an amount from about 25 to about 40 wt % of the total weight of the composition; a source of fats; and a source of carbohydrates is provided. The carbohydrates may be present in an amount of from about 40 to about 70 wt % of the total weight of the composition and may comprise at least one reducing sugar and at least one non-reducing sugar. The reducing sugar and non-reducing sugar may be present in a ratio of from about 1:0.2 to about 1:1. In certain embodiments, the fiber may comprise from about 25 to about 30 wt % of the total composition weight. The fat source may comprise from about 3 to about 18wt % of the composition and, if present, a protein source may comprise up to about 10 wt % of the total composition and, in some cases, from about 1 to about 6 wt % of the composition.

In certain embodiments of the present invention, a confectionery composition is provided having a source of fats in an amount of from about 5 to about 10 wt % of the composition; a source of carbohydrates in an amount of from about 55 to about 65 wt % of the composition; and at least one dietary fiber comprising from about 25 to about 30 wt % of the total weight of the composition.

In a preferred embodiment, the confectionery composition containing fiber is a "fiber chew" in the form of a palatable, good tasting, bite-sized confectionery containing the fiber and other ingredients. Such fiber chews may be individually wrapped and sold in amounts that are convenient for the consumer to purchase and consume as a dietary supplement.

The present invention also relates to processes for making a confectionery composition containing fibers. In one particular embodiment the process comprises preparing a mixture of fats and carbohydrates; heating the mixture to a temperature sufficient to cook it and form a cooked confectionery composition; adding dietary fiber to the mixture in an amount from about 25 to about 40 wt % of the total weight of the confectionery composition; and cooling the mixture to form the confectionery composition containing fiber. The carbohydrates may be present in an amount from 40 to about 70 wt % of the total weight of the composition and may comprise at least a reducing sugar and at least a non-reducing sugar. The reducing sugar and non-reducing sugar may be present in a ratio of from about 1:0.2 to about 1:1. The fats may comprise from about 3 to about 18 wt % of the total weight of the composition.

In certain embodiments of the present invention, a source of protein may be added to the mixture of fats and carbohydrates before cooking the mixture. If a source of protein is present, it may comprise up to about 10 wt % of the total weight of the confectionery composition.

Other and further objects, features and advantages of the present invention will be readily apparent to those skilled in the art.

DETAILED DESCRIPTION OF THE INVENTION

Definitions

The term "weight percentages" and the acronym "wt %" as used herein refer to weight percentages based on the total weight of the confectionery composition in its final form with all ingredients added.

The term "fiber" as used herein, unless indicated otherwise, refers to a single fiber or mixtures of fibers.

The terms "glucose" and "dextrose" are used interchangeably herein.

The term "dextrose equivalent" and the acronym "DE" as used herein refer to the percent of reducing sugars on a dry basis calculated as dextrose. Glucose (or corn) syrups are formed by reacting a starch with an acid and/or enzyme. DE is a measurement of the degree of hydrolysis that starches undergo to yield different DE syrups. Standard corn syrups are defined as having about a DE value of approximately 42. Syrup processed to have a "high" DE using has a value of approximately 65 DE. The higher the level of DE in a carbohydrate component, the sweeter the ingredient. With the sweetness factor, the high DE carbohydrates may also contribute to negative product characteristics, such as greater tendency to crystallize (could lead to a product defect if there's too much or too big of a crystal formulation); less viscosity (could lead to a product that is too sticky, inability to hold form); tendency to brown (could lead to flavor problems and coloration problems); tendency to be more hygroscopic (could lead to product that has too much crystallization); and the like as known in the art.

The term "reducing sugar" as used herein refers to a sugar that can chemically react with a special copper reagent known as Fehlings solution (alkaline solution). In the reaction, the "reducing" sugar will reduce this copper solution to copper oxide (cuprous oxide). Corn syrups, fructose, and milk sugars are examples of reducing sugars.

The term "non-reducing sugar" as used herein refers to a sugar that will not react with the special copper reagent known as Fehlings solution (alkaline solution). Sucrose is a non-reducing sugar.

The term "water activity" and the acronym "Aw" as used herein refer to and are defined to equal to Equilibrium Relative Humidity ("ERH") divided by 100. ERH is the equilibrium state at which the confectionery product neither absorbs nor loses moisture to the environment. In a confectionery, the ERH is influenced by the composition of the syrup phase, particularly the water content thereof, and may be present as free or bound water. The free water influences the storage capabilities of the confectionery which could result in undesired crystallization of the confectionery during storage.

The Invention

Generally, as known in the art, carbohydrates used to produce caramels, toffees, and other chewy confectioneries have about 1 part reducing sugars and about 1.2 to 1.4 parts non-reducing sugars. However, when these known ratios of carbohydrates are used to produce compositions similar to those of the present invention, the resulting confectionery compositions containing the desired fiber are unexpectedly hard and grainy in texture. Conversely, when high ratios of reducing sugar to non-reducing sugar are used, the resulting compositions are unexpectedly sticky and runny. Accordingly, manufacture of palatable fiber containing confectionery compositions appeared unfeasible using known compositions and techniques when initially tested. However, it was discovered through experimentation that certain ratios of reducing sugars to non-reducing sugars in combination with particular ingredients in selected amounts could be used to produce a palatable confectionery composition containing useful amounts of dietary fiber.

Therefore, in one aspect, the present invention encompasses confectionery compositions comprising from about 5 to about 40 wt % of a fiber or mixtures of fibers; from about 3 to about 18 wt % of a fat; from about 0 to about 10 wt % of a protein; from about 40 to about 70 wt % of a carbohydrate comprising at least one reducing sugar and at least one non-reducing sugar, wherein the reducing sugar and non-reducing sugar are present in a ratio of from about 1:0.2 to about 1:1 (reducing sugar: non-reducing sugar).

The fiber can be any fiber compatible with the confectionery ingredients and beneficial as a dietary fiber. Preferably, the fiber is selected from the group consisting of arabinogalactan, polycarbophil, calcium polycarbophil, fibersol, inulin, methylcellulose, and psyllium. Most preferably, the fiber is psyllium.

Not all fibers are useful for producing the fiber containing confectionery compositions of the present invention. Fibers such as hydrolyzed guar gum, microcrystalline cellulose and hydroxypropyl methylcellulose have been found to produce fiber containing confectionery compositions with unacceptable stability, texture, feel, taste, or aftertaste. Similarly, not all amounts of an otherwise acceptable fiber are useful for producing a palatable confectionery composition containing fiber. Too much of an otherwise acceptable fiber can cause the composition to have unacceptable stability, texture, feel, taste, or aftertaste. Very small amounts of fiber, e.g., 1%, can be easily incorporated into the compositions but too little fiber would make the composition a poor supplement for the consumer.

Preferably, the fiber is present in the composition in amounts of from about 10 to about 40 wt %, most preferably from about 10 to about 30 wt %.

The fat can be any fat useful for making the present confectionery composition and compatible with the fiber. The fat includes any commercial available fat, or mixture of any fat, such as, for example, hardened vegetable fat/oil, cocoa butter, milk fat; butter oil, whole butter or any fraction thereof, butter, hydrogenated soybean oil, and hydrogenated vegetable oils, e.g., any single source vegetable oil or mixed vegetable oils. Preferably, the fat is selected from the group consisting of cocoa butter, coconut oil, and partially hydrogenated vegetable oil.

Preferably, the fat is present in the composition in amounts of from about 3 to about 15 wt %, most preferably about 8 to about 12 wt %.

The optional protein can be any protein useful for making the present confectionery composition and compatible with the fiber. The protein includes any commercial available protein, or mixture of proteins, such as, for example, milk components such as sweetened condensed skim milk (milk solids), condensed whole milk, evaporated milk, reconstituted milk powder, protein hydrolysates, milk protein concentrate, total milk protein, or mixtures thereof. Whey proteins may be used as less expensive substitute for milk solids. Whey proteins include sweet (rennet) whey powder, whey protein concentrates or high calcium fractionated whey products. When whey proteins are selected as a protein, either as the single source or in combinations with other proteins, it should be taken into account that the whey products are more reactive in Maillard reactions than other milk proteins. The Maillard reaction (reaction of the amino groups in the protein and the glycosidic hydroxyl, reducing groups) of the sugars results in a brown condensation pigment that may contribute to flavor and color development of the confectionery particularly for caramel, butterscotch or "brown" flavors, but is generally undesirable for fruit or mild flavors. Other proteins such as soy proteins, fish proteins; egg proteins; or a mixture thereof may also be used. Preferably, the protein is selected from the group consisting of nonfat milk based protein and whey protein.

The protein can be present in the composition in any amount up to about 10 wt %, e.g., from about 0.01 to about 10 wt %. Preferably, the protein when used is present in the composition in amounts of from about 1 to about 6 wt %, most preferably from about 2 to about 5 wt %.

A stabilizer can be added to the composition to prevent excessive protein denaturization and preserve the texture of the composition. Any stabilizer known in the food industry and compatible with the composition may be used, e.g., disodium phosphate and sodium citrate. The stabilizer is added to the composition in amounts required to prevent excessive denaturization and preserve the texture, typically in amounts of up to about 1 wt %, preferably from about 0.01 to about 0.5 wt %, most preferably from about 0.05 to about 0.01 wt %.

The carbohydrate comprises at least one reducing sugar and at least one non-reducing sugar. The reducing sugar and non-reducing sugar can be any carbohydrate of the appropriate type useful for making the present confectionery composition and compatible with the fiber. Such carbohydrates are selected from any source commonly used in the art of preparing confectionery products (See, e.g., Food Technology, March, 1991, pp. 148–149). The carbohydrate can be various corn syrups (starch hydrolysates), polydextrose (polymer of dextrose with sorbitol and an acid), sucrose, trehalose, dextrose, fructose, lactose, maltose, brown sugar, cane sugar, and beet sugar; invert sugar; sugar alcohols (sorbitol, maltitol, mannitol, xylitol), honey; lycasin, and mixtures thereof.

Preferably, the carbohydrate is a mixture comprising at least one reducing sugar selected from corn syrup (24 DE to 65 DE), high fructose corn syrup, corn syrup solid, high maltose corn syrup, fructose, invert sugar, and mixtures thereof and at least one non-reducing sugar selected from the group consisting of sucrose and trehalose. Particularly preferred carbohydrates use sucrose as the non-reducing sugar in combination with various reducing sugars shown in Table 1.

TABLE 1

Preferred Sources of Reducing Sugars

| Corn Syrup 42DE | Corn Syrup 62/63 DE | High Maltose Corn Syrup 42 DE | High Fructose Corn Syrup | Fructose |
|---|---|---|---|---|
|   | X | X |   |   |
| X |   |   |   | X |
|   |   | X | X |   |
| X |   |   | X |   |
|   | X | X | X |   |
| X | X |   | X |   |
|   | X | X | X |   |
| X | X |   |   |   |

As shown in the Table 1, a non-reducing sugar such as sucrose may be combined with various combinations of reducing sugars selected from the following combinations: (1) a corn syrup having a DE of 62/63 with a high maltose corn syrup having a 42 DE, (enzymatically treated corn syrup resulting in the production of a maltose); (2) a corn syrup (42 DE) and fructose; (3) a high maltose corn syrup (42 DE) with a high fructose corn syrup; (4) a corn syrup (42 DE) and a high fructose corn syrup; (5) a corn syrup (62/63 DE), high maltose corn syrup, and a high fructose corn syrup; (6) a corn syrup (42 DE) and a corn syrup (62/63 DE) and a high fructose corn syrup; and (7) a corn syrup (42 DE) and a corn syrup (62-63 DE).

The ratio of the reducing sugar to non-reducing sugar is preferably from about 1:0.3 to about 1:0.8, most preferably from about 1:0.3 to about 1:0.4.

Preferably, the carbohydrate is present in the composition in amounts of from about 50 to about 70 wt %, most preferably from about 60 to about 70 wt %.

In one embodiment, the carbohydrate comprises from about 10 to about 50 wt % of an oligosaccharide, a polysaccharide, or a mixture thereof and from about 50 to about 90% of a monosaccharide, a disaccharide, or a mixture thereof. Sugars in the category of oligosaccharides, polysaccharides, monosaccharides, and disaccharides are readily ascertainable by one skilled in the art (See, e.g., Food Technology, March, 1991, pp. 148–149).

The confectionery composition optimally has from about 4 to about 10 wt % moisture, preferably from about 6 to about 8 wt %. The water activity (Aw) of the confectionery is below about 0.65, preferable from about 0.40 to about 0.55.

In a preferred embodiment, the composition comprises about 30 wt % of psyllium, about 8 wt % of cocoa butter, about 54 wt % of a carbohydrate comprising sucrose as a non-reducing sugar and corn syrup as a reducing sugar, wherein the reducing sugar to non-reducing sugar ratio is about 1:0.3 to 1:0.4, and about 8 wt % water.

The carbohydrate fraction of the confectionery may include other carbohydrate components such as lactose and maltodextrin (to make compositions having fewer calories) and artificial sweeteners useful as sweetening agents. Preferably such sweeteners are selected from the group consisting of aspartame, saccharin, lactitol, sucralose, acesulfame-K, stevia; Neohesperidine DC, and cyclamates.

As known to skilled artisans, any number of miscellaneous ingredients may be included in the composition. For example, any one or a combination of the following may be included: acidulants (citric acid, fumaric acid, lactic acid gluconic acid; or a mixture thereof), VELTOL® flavor enhancer, TALIN® flavor enhancer/sweetener, SALATRIM® reduced-calorie fat, sugar ester, gums, gelatin, carrageenan, cellulose, ginseng, active phyto chemicals such as ferulic acid (apples), beta carotene (carrots, sweet potatoes), capsicanoids (peppers), anthocyanidins (berries), bioflavanoids like hesperidin or quercetin (citrus fruits), d-limonene (citrus fruits), isothiocyanates (cruciferous vegetables), s-allyl cysteine and S-methyl cysteine (garlic), 6-gingerol (ginger), ellagic acid (grapes, tea), polyphenol catechins (green tea), allyl sulfides (onion family), phytosterols and isoflavones (soybeans), lycopene (tomatoes), curcumin (tumeric), and the like. Colors that may be included may be artificial or natural. Examples of natural colors are caramel colors which are derived from pure caramelized sugars specific carbohydrates which are heated with accelerators such as ammonia. Also, vitamins such as beta carotene or the B vitamins may impart yellow and orange colors which may be compatible with certain confectionery flavors.

The confectionery composition may also contain various flavoring agents to control the taste or aftertaste of the composition. In a preferred embodiment, the composition contains encapsulated citric acid. Such acid provides a fruit flavored composition. The citric acid is added in amounts of from about 0.1 wt % to about 2 wt % of an encapsulated citric acid. Such encapsulated acid is commercially available or can be prepared as known in the art. When the citric acid is not encapsulated, the processing of the confectionery composition is difficult due to the release of carbonate dioxide and subsequent foaming. The citric acid functions to provide tartness of the fruit flavored confectionery compositions. Further, the encapsulated citric acid substantially prevents the inversion of sucrose when it is employed as one of the carbohydrate components. Inversion is the hydrolysis of sucrose to its component monosaccharides, dextrose and fructose. Increased levels of fructose will result in increased hygroscopicity (defined as tendency to pick up moisture resulting in a sticky or crystallized product), an undesired property of a confectionery, and thus are preferably avoided by formulation adjustments.

The confectionery composition is useful because it provides a method for delivering supplemental fiber to a consumer in a form having the desirable characteristics of a confectionery, e.g., good taste, good texture, and substantially no fiber taste or aftertaste. The compositions are also stable for extended periods when exposed to normal levels of heat and moisture and thus have an extended shelf live.

In another aspect, the present invention provides a process for producing confectionery compositions containing dietary fiber. The process comprises the steps of:

preparing a premix containing from about 3 to about 18 wt % of a fat and from about 40 to about 70 wt % of a carbohydrate comprising at least one reducing sugar and at least one non-reducing sugar present in a ratio of reducing sugar to non-reducing sugar of from about 1:0.2 to about 1:1;

heating the premix to a temperature sufficient to cook the premix and form a cooked confectionery composition;

adding fiber to the cooked confectionery composition in amounts sufficient to comprise from about 5 to about 40 wt % of the cooked confectionery composition; and cooling the cooked confectionery composition to form a confectionery composition containing fiber.

Various methods known to skilled confectionery making artisans can be used for producing the confectionery compositions of the present invention. Any cooking method compatible with confectionery compositions such as those of the present invention can be used. The temperature used for cooking the premix can be any temperature sufficient to cook the composition depending upon its components but is preferably a temperature of from about 220–270° F. (105–132° C.). A preferred process comprises forming a premix comprising the carbohydrate, fat, and optional protein mixture along with any ingredients that facilitate mixing the ingredients, heating the premix to a temperature of from about 220–270° F. (105–132° C.) to form a cooked composition; thoroughly mixing a fiber into the cooked composition while it is still warm enough to permit easy mixing; and cooling the cooked composition containing the fiber to form a fiber containing confectionery composition. Preferably, a hydrocolloid (such as, for example, carrageenan, locust bean gum, furcellaran, agar, gellan, or mixtures thereof, most preferably carrageenan) is used. The hydrocolloid (from about 0.01 to about 0.2 wt %, preferably 0.08 to about 0.09 wt %) is dispersed in an aqueous solution.

A portion of selected carbohydrate (up to about 1 wt % of a monosaccharide or disaccharide, most preferably fructose, sucrose or a mixture thereof) may be present in the aqueous dispersion or alternatively the entire source carbohydrate is added after the initial mixing of the aqueous dispersion containing the hydrocolloid. Once the aqueous dispersion is agitated, the carbohydrate (or remaining portion of carbohydrate); milk product (preferably sweetened condensed skim milk) and fat (optionally in a form contributing to flavor such as cocoa butter) are heated with a food grade emulsifying agent (used in a range of 0 to 5 wt %, more preferably 0.05 to 0.5 wt %), preferably lecithin or glycerol manostearate, to form an emulsion. The resulting carbohydrate-fat-protein (protein is optional) mixture is then heated to a temperature ranging from about 220–270° F. (105–132° C.), preferably 230–245° F. (110–118° C.), if processing is by a batch open pan cooking to form a cooked mass. For a continuous manufacture, the carbohydrate-fat-protein mixture is passed through scraped surface evaporators and then transferred to carameliser kettles and cooked at about 220–270° F. (104–132° C.), preferably 230–245° F. (110–118° C.), to form a cooked mass. Additional flavors and food grade dyes (such as chocolate liquor, vanilla, food colors, caramel colors, and fruit flavor) may be added to the cooked composition if desirable. The fiber is added to this cooked composition and mixed thoroughly. The resulting fiber containing composition can then be cooled and processed to produce a confectionery composition containing fiber.

The confectionery composition may be produced in any standard confectionery making machinery, either in a batch process using open pan cooking or in a continuous system. In a continuous system, the basic mix is preferably caramelized and other ingredients added thereafter. The cooked composition may then be poured onto a cooling table, cut, and further processed on a standard caramel wrapping machine. The confectionery may be further processed in any acceptable commercial form including bars, rolls, individually wrapped pieces, and the like.

Wrapping materials may be selected from any known, non-reactive material used in the food industry. The composition may be formulated using known flavor technology (natural, artificial, and nature identical) including preparations as a caramel, chocolate or fruit flavored chew. The caramel flavor may be contributed to the confectionery naturally during the cooking process or commercially by adding caramel powders, dairy products (e.g., milk crumb) and/or other flavoring ingredients. Cocoa butter, cocoa, cocoa liquor, chocolate flavor, and mixtures thereof are particularly useful in providing an acceptable tasting chocolate confectionery. For fruit flavored confectionery products, flavor may be provided by encapsulated citric acid and optionally additional fruit juices and/or fruit flavoring commonly used in food technologies.

The invention having been generally described, the following examples are given as particular embodiments of the invention and to demonstrate the practice and advantages thereof. It is understood that the examples are given by way of illustration and are not intended to limit the specification or the claims to follow in any manner.

EXAMPLE 1

Ten thousand nine hundred and sixty-two (10,962) grams (g) of corn syrup was heated to 160° F. (71° C.) while occasionally stirring. The syrup was then added to a Groen jacketed kettle. While stirring, a blend consisting of 3,240 g of sucrose and 21.24 g of carrageenan was added to the Groen kettle and mixed until well dispersed. In a separate container, 4.2 g of sodium phosphate, dibasic, was added to 120 g of water, mixed until dissolved and then thoroughly mixed with 4,965 g of skim milk concentrate. In a separate container, a blend of 1,800 g of hydrogenated vegetable oil, 56.76 g of lecithin and 27.24 g of glycerol monostearate was warmed over low heat while stirring, added to the mixture with skim milk concentrate and mixed thoroughly until uniform. The blend was then added to the Groen kettle and heated with the dial set at approximately 8 to 10 until desired temperature is reached. The mixture in the Groen kettle was heated to 240° F. (116° C.) while adjusting the mixer speed and dial setting to keep from boiling over. The mixture in the Groen kettle was heated to 240° F. (116° C.) while adjusting the mixer speed and temperature to keep from boiling over. Once the mixture reached 240° F. (116° C.) and the confectionery base was produced, it was transferred to a metal bucket, which was subsequently placed in an ice water bath. The mixture was then stirred until a temperature of 150–160° F. (65–71° C.) was reached. The mixture was divided into lots of 450 g, placed in an appropriate container and allowed to cool to room temperature. In a Pyrex beaker, 200 g of the cooled base was added and heated in a microwave to approximately 175° F. (80° C.). The base was then added to a Kitchen Aid, metal mixing bowl along with 48.78 g arabinogalactan. This blend was then mixed in the Kitchen Aid mixer at speed 6 for 1 minute. After mixing, the blend was poured into a plastic weigh boat, wrapped in a plastic bag, and allowed to cool to room temperature.

The product was tested for flavor, texture, and overall product quality by having 6 people sample the product and provide an opinion on the flavor, texture, and overall product quality. The results can be found in Table 2.

The procedure given in Example 1 was repeated several times using variations of amounts and/or types of fibers substituted for the 48.78 g of arabinogalactan. The fibers, amounts, and results are show in Table 2.

TABLE 2

| Fiber | Amount (grams) | Flavor | Texture | Product Quality |
| --- | --- | --- | --- | --- |
| Arabinogalactan | 48.78 | Pleasant | Slight grainy Soft | Acceptable Could be optimized. |
| Arabinogalactan | 64.94 | Pleasant | Slight grainy Soft | Acceptable Could be optimized. |
| Arabinogalactan | 129.03 | Pleasant | Grainy Too stiff to confortably chew | Unacceptable Could be optimized. |
| Raftiline Inulin | 45.45 | Good | Smooth Slightly stiff | Acceptable Could be optimized |
| Inulin | 60.24 | Good | Smooth Soft | Acceptable Could be optimized |
| Inulin | 117.65 | Good | Smooth Soft | Acceptable Could be optimized |
| Fibersol | 48.78 | Pleasant | Smooth, Soft | Acceptable Could be optimized |
| Fibersol | 64.94 | Pleasant | Slightly Stiff | Acceptable Could be optimized |
| Fibersol | 129.03 | Slight aftertaste | Stiff | Acceptable Could be optimized |

TABLE 2-continued

| Fiber | Amount (grams) | Flavor | Texture | Product Quality |
|---|---|---|---|---|
| Psyllium 40 mesh | 48.78 | Pleasant | Gritty, Soft | Acceptable Could be optimized |
| Psyllium 40 mesh | 58.458 (180 g base) | Pleasant, Slight aftertaste | Gritty, Soft | Acceptable Could be optimized |
| Hydroxypropyl Methylcellulose | 52.63 | Strong aftertaste | Grainy, firm | Unacceptable |
| Hydroxypropyl Methylcellulose | 70.42 | Strong aftertaste | Grainy, firm | Unacceptable |
| Hydroxypropyl Methylcellulose | 142.86 | Strong aftertaste | Grainy, hard | Unacceptable |
| Microcrystalline Cellulose | 52.62 | Strong aftertaste | Grainy, firm | Unacceptable |
| Microcrystalline Cellulose | 70.42 | Strong aftertaste | Grainy, hard | Unacceptable |
| Microcrystalline Cellulose | 142.86 | Strong aftertaste | Grainy, hard | Unacceptable |
| Hydrolyzed Guar Gum | 52.63 | Slight aftertaste | Grainy, firm | Unacceptable |
| Hydrolyzed Guar Gum | 70.42 | Slight aftertaste | Grainy, hard | Unacceptable |
| Hydrolyzed Guar Gum | 142.86 | Slight aftertaste | Grainy, hard | Unacceptable |
| Raftiline Inulin | 60.24 | Pleasant | Smooth, firm | Acceptable Could be optimized. |
| Raftiline Inulin | 117.65 | Pleasant | Smooth, hard | Unacceptable Could be optimized. |
| Raftilose Inulin | 60.24 | Pleasant | Smooth, firm | Acceptable Could be optimized. |
| Raftilose Inulin | 117.65 | Pleasant | Smooth, hard | Unacceptable |
| Raftiline Inulin Arabinogalactan | 38.42 25.92 | Pleasant | Slightly grainy, soft | Acceptable Could be optimized |
| Methylcellulose Arabinogalactan | 41.91 26.29 | Pleasant | Slightly grainy, soft | Acceptable Could be optimized |
| Fibersol Arabinogalactan | 38.96 25.97 | Pleasant | Slightly grainy, soft | Acceptable Could be optimized |
| Methylcellulose Raftiline Inulin | 41.84 25.95 | Pleasant | Smooth, soft | Acceptable Could be optimized |
| Methylcellulose | 70.00 | Slight aftertaste | Smooth, soft | Acceptable Could be optimized |

The procedure given in Example 1 was repeated several times using variations of amounts and/or types of fibers substituted for the 48.78 g arabinogalactan. However, the product was tested for flavor, texture, and overall product quality by having 3 people sample the product and provide their opinion on flavor, texture, and overall product quality. The results can be found in Table 3.

TABLE 3

| Fiber | Amount (grams) | Flavor | Texture | Product Quality |
|---|---|---|---|---|
| Raftilose Inulin | 78.13 | Pleasant | Very grainy | Unacceptable |
| Raftiline Inulin | 81.97 | Good | Smooth, pliable | Acceptable Could be optimized. |
| Raftiline Inulin | 102.64 | Good | Smooth, pliable | Acceptable Could be optimized. |
| Raftiline Inulin | 114.16 | Good | Smooth, less pliable | Acceptable Could be optimized. |
| Psyllium (50 mesh) | 64.94 | Strong aftertaste | Gritty (but less than 40 mesh), soft | Unacceptable |
| Psyllium (60 mesh) | 64.94 | Strong aftertaste | Gritty (but less than 40 mesh), soft | Unacceptable |

EXAMPLE 2

Six hundred fifty-three (653) grams (g) of corn syrup was heated to 160° F. (71° C.) while occasionally stirring. A blend of 158 g sucrose and 1.05 g carrageenan was added to the corn syrup and mixed until well dispersed. In a separate container, 0.21 g sodium phosphate (dibasic) was added to 50 g water and mixed until dissolved. The mixture containing sodium phosphate was then added to 309.86 g skim milk concentrate, stirred, and subsequently added to the corn syrup mixture and blended thoroughly. In a separate container, 97 g of hydrogenated vegetable oil, 2.82 g lecithin, and 1.36 g glycerol monostearate were added and warmed over low heat while stirring. The mixture containing hydrogenated vegetable oil was then added to the mixture containing skim milk concentrate and mixed until uniform in appearance. While stirring, the mixture was heated to 237° F. (114° C.) on an electric range using medium heat to produce the base. The base was then added to a Kitchen Aid mixing bowl and mixed until the temperature reached 160° F. (71° C.). Once the desired temperature was reached, 5.40 g vanilla flavor and 250 g Raftiline Inulin were added and mixed until uniform. The product was then poured onto a metal tray and allowed to cool to room temperature. The product was tested for flavor, texture, and overall product quality by having 9 people sample the product in a meeting setting and provide their opinion on flavor, texture, and overall product quality. The results can be found in Table 4.

The procedure given in Example 2 was repeated without Raftiline Inulin, and used 325 g Arabinogalactan Fiber in the sucrose/carrageenan blend. The skim milk concentrate was reduced to 286.65 g. The fibers, amounts, and results are shown in Table 4.

The procedure given in Example 2 was repeated with the following changes: 661 g corn syrup and 284.79 g skim milk concentrate. From the resulting base, various amounts and types of fiber were added to a beaker containing 200 g base, mixed well, and allowed to cool. The product was tested for flavor, texture, and overall product quality by having 4 people sample the product in a meeting setting and provide their opinion on flavor, texture, overall product quality. The results can be found in Table 4.

TABLE 4

| Fiber | Amount (grams) | Flavor | Texture | Product Quality |
|---|---|---|---|---|
| Raftiline Inulin | 250 | Excellent | Smooth and soft | Acceptable |
| Arabino-galactan | 325 | Good | Smooth and soft | Acceptable |
| Psyllium (60 mesh) | 77.93 | Pleasant | Not very gritty, soft | Acceptable, could be optimized |
| Psyllium (60 mesh) | 90.92 | Aftertaste | Somewhat gritty, soft | Unacceptable |
| Psyllium (60 mesh) | 103.91 | Strong aftertaste | Gritty, soft | Unacceptable |
| Psyllium (60 mesh) | 64.94 | Pleasant | Not very gritty, soft | Acceptable, could be optimized |
| Psyllium (60 mesh) | 271.71 | Aftertaste | Gummy, product sticks in mouth | Unacceptable |
| Arabino-galactan | 135.83 (994 g base) | | | |

EXAMPLE 3

One thousand five hundred and twenty (1,520) pounds (lbs) of high fructose corn syrup 55 was added to a jacketed tank with scraper blade agitation and heated to 130° F. (54° C.). A mixture of 5.7 lbs carrageenan and 5 lbs sucrose was added followed by an additional 205 lbs of sucrose. To the tank, the following was added in order: 1,332 lbs high maltose corn syrup 42 DE, 493 lbs corn syrup 63 DE, and 585 lbs water. A mixture of 8.1 lbs glycerol monostearate and 5 lbs sucrose was then added. To the tank, the following was added in order: 1,504 lbs sweetened condensed milk, 302 lbs cocoa butter, 19.32 lbs salt, 15.4 lbs lecithin, and 1 lb sodium phosphate. The contents of the tank were pumped to a mix tank and heated to approximately 175° F. (79° C.). The mixture was then cooked to approximately 242° F. (117° C.). The mixture was then held in a carmelization tank until the appropriate color developed, and the moisture level reached approximately 11.5%. The product was then emptied into 5 gallon buckets, and placed in a refrigerated room and allowed to cool to room temperature. From the bucket, 850 g of base was placed into a beaker and placed into a warm water bath to heat the base to 180° F. (82° C.). The heated base was placed in a Kitchen Aid mixing bowl and set to speed 6. While mixing, 333 g of psyllium (60 mesh) was added along with 6.8 g vanilla flavor, and mixed thoroughly. The product was then allowed to cool to room temperature. The product was tested for flavor, texture, and overall product quality by having 4 people sample the product in a laboratory/meeting setting and provide their opinion on flavor, texture, overall product quality. The results are shown in Table 5. The procedure given in Example 3 was repeated several times using variations of amounts and/or types of fibers substituted for the 333 g psyllium (60 mesh) as well as flavors. The fibers, amounts, and results are show in Table 5.

TABLE 5

| Fiber | Amount (grams) | Flavor | Texture | Product Quality |
|---|---|---|---|---|
| Fiber | Amount | Flavor | Texture | Product Quality |
| Psyllium (60 mesh) | 333 | Bitter aftertaste | Gums in mouth and sticks to teeth. | Unacceptable |
| Psyllium (40 mesh) | 333 | Pleasant, slight aftertaste | Low grit, soft | Acceptable, could be optimized |
| Psyllium (40 mesh) | 333 | Pleasant, slight aftertaste | Low grit, soft | |
| Flavor | 8.75 | | | |
| Psyllium (40 mesh) | 312 | Pleasant, slight aftertaste | Low grit, soft | |
| Flavor | 9.86 (961 g base) | | | |
| Psyllium (40 mesh) | 4,408.65 | Pleasant, low aftertaste | Low grit, soft | Approx. 72 people in focus groups. Product is acceptable, but could be optimized. |
| Flavor | 120(10, 59135 g base) | | | |
| Fibersol | 2,282.00 | Pleasant | Smooth, very hard | Unacceptable, could be optimized |
| Flavor | 62.11 (5,482.28 g base) | | | |
| Psyllium (60 mesh) | 166.50 (400 g base) | Strong aftertaste | Gritty, soft | Unacceptable |
| Psyllium - orange flavored | 166.50 (400 g base) | Strong orange, low aftertaste | Gritty, soft | Acceptable, could be optimized |
| Calcium Polycarbophil | 11 (200 g base) | Good flavor | Soft | Acceptable |
| Calcium Polycarbophil | 23.357 (200 g base) | Good flavor | Soft | Acceptable |
| Calcium Polycarbophil | 29.77 | Slight aftertaste | Slight grit, soft | Acceptable |
| Psyllium (40 mesh) | 56.014 (200 g base) | | | |
| Calcium Polycarbophil | 32.019 | Aftertaste | Gritty | Acceptable |
| Psyllium (40 mesh) | 75.359 (200 g base) | | | |
| Calcium Polycarbophil | 34.627 | Strong aftertaste | Gritty, stiff | Unacceptable |
| Psyllium (40 mesh) | 97.784 (200 g base) | | | |

Obviously many modifications and variations of the present invention are possible in light of the above teachings. It is therefore to be understood that within the scope of the appended claims the invention may be practiced otherwise than as specifically described.

What is claimed is:

1. A confectionery composition comprising a dietary fiber or a mixture of dietary fibers in an amount from about 25 to about 40 wt % of the total weight of the composition; a source of fats; and a source of carbohydrates, wherein the carbohydrate comprises at least one reducing sugar and at least one non-reducing sugar, and the reducing sugar is present in an amount that is greater than or equal to the amount of the non-reducing sugar.

2. The confectionery composition of claim 1 wherein the source of carbohydrates is selected from the group consisting of corn syrups, polydextrose, sucrose, trehalose, dextrose, fructose, lactose, maltose, brown sugar, cane sugar, and beet sugar, invert sugar; sugar alcohols, honey, lycasin, and mixtures thereof.

3. The confectionery composition of claim 1 wherein the source of carbohydrates is present in an amount from about 40 to about 70 wt % of the total weight of the composition.

4. The confectionery composition of claim 1 wherein the source of carbohydrates comprises at least one reducing sugar and at least one non-reducing sugar.

5. The confectionery composition of claim 1 wherein the reducing sugar and non-reducing sugar are present in a ratio from about 1:0.2 to about 1:1.

6. The confectionery composition of claim 5 wherein the reducing sugar and non-reducing sugar are present in a ratio from about 1:0.3 to about 1:0.8.

7. The confectionery composition of claim 6 wherein the reducing sugar and non-reducing sugar are present in a ratio from about 1:0.3 to about 1:0.4.

8. The confectionery composition of claim 1 wherein the fiber is selected from the group consisting of arabinogalactan, polycarbophil, calcium polycarbophil, fibersol, inulin, methylcellulose, psyllium, and mixtures thereof.

9. The confectionery composition of claim 8 wherein the fiber comprises from about 25 to about 30 wt % of the composition.

10. The confectionery composition of claim 8 wherein the fiber is psyllium.

11. The confectionery composition of claim 8 wherein the fiber is calcium polycarbophil.

12. The confectionery composition of claim 1 wherein the fat is selected from the group consisting of hardened vegetable fat/oil, cocoa butter, milk fat; butter oil, whole butter or any fraction thereof, butter, hydrogenated soybean oil, and hydrogenated vegetable oils, and mixtures thereof.

13. The confectionery composition of claim 1 wherein the fat is selected from the group consisting of cocoa butter, coconut oil, and partially hydrogenated vegetable oil, and mixtures thereof.

14. The confectionery composition of claim 13 wherein the fat comprises from about 3 to about 18 wt % of the composition.

15. The confectionery composition of claim 13 wherein the fat comprises from about 6 to about 12 wt % of the composition.

16. The confectionery composition of claim 1 further comprising a source of protein in an amount of up to about 10 wt % of the total weight of the composition.

17. The confectionery composition of claim 16 wherein the protein is selected from the group consisting of milk components such as sweetened condensed skim milk (milk solids), condensed whole milk, evaporated milk, reconstituted milk powder, protein hydrolysates, milk protein concentrate, total milk protein, whey proteins, and mixtures thereof.

18. The confectionery composition of claim 16 wherein the protein is selected from the group consisting of nonfat milk based protein and whey protein, and mixtures thereof.

19. The confectionery composition of claim 16 wherein the protein comprises from about 1 to about 6 wt % of the composition.

20. The confectionery composition of claim 1 wherein the reducing sugar is selected from the group consisting of corn syrup and fructose, and mixtures thereof, and the non-reducing sugar is selected from the group consisting of sucrose and trehalose, and mixtures thereof.

21. The confectionery composition of claim 1 wherein the non-reducing sugar is sucrose and the reducing sugar is selected from the group consisting of corn syrup, high fructose corn syrup, corn syrup solid, high maltose corn syrup, fructose, and mixtures thereof.

22. A confectionery composition comprising:
 (a) A source of fats in an amount from about 5 to about 10 wt % of the total weight of the composition;
 (b) A source of carbohydrates in an amount from about 55 to about 65 wt % of the total weight of the composition, wherein the carbohydrate comprises at least one reducing sugar and at least one non-reducing sugar, and the reducing sugar is present in an amount that is greater than or equal to the amount of the non-reducing sugar; and
 (c) from about 25 to about 30 wt % of the total weight of the composition of at least one dietary fiber selected from the group consisting of arabinogalactan, polycarbophil, calcium polycarbophil, fibersol, inulin, methylcellulose, and psyllium.

23. The confectionery composition of claim 22 further comprising a source of protein in an amount of up to 10 wt % of the composition, and wherein the ratio of reducing sugar to non-reducing sugar is from about 1:0.2 to about 1:1.

24. The confectionery composition of claim 22 wherein the dietary fiber is psyllium.

25. The confectionery composition of claim 22 where the dietary fiber is calcium polycarbophil.

26. A process for producing confectionery compositions comprising the steps of:
 preparing a premix containing a source of fats and a source of carbohydrates, wherein the carbohydrate comprises at least one reducing sugar and at least one non-reducing sugar, and the reducing sugar is present in an amount that is greater than or equal to the amount of the non-reducing sugar;
 heating the premix to a temperature sufficient to cook the premix and form a cooked confectionery composition;
 adding dietary fiber to the cooked confectionery composition in amounts sufficient to comprise from about 25 to about 40 wt % of the total weight of the confectionery composition; and
 cooling the cooked confectionery composition to form a confectionery composition containing fiber.

27. The process of claim 26 wherein the premix further comprises a source of protein in an amount of up to about 10 wt % of the cooked confectionery composition, and wherein the ratio of reducing sugar to non-reducing sugar is from about 1:0.2 to about 1:1.

28. The process of claim 26 wherein the premix is cooked at a temperature of from about 220–270° F. (105–132° C.).

29. A process for producing confectionery compositions comprising the steps of:
 preparing a premix containing from about 3 to about 18 wt % of a source of fats and from about 40 wt % to about 70 wt % of a source of carbohydrates, wherein the carbohydrate comprises at least one reducing sugar and at least one non-reducing sugar, and the reducing sugar is present in an amount that is greater than or equal to the amount of the non-reducing sugar;
 heating the premix to a temperature sufficient to cook the premix and form a cooked confectionery composition;
 adding dietary fiber to the cooked confectionery composition in amounts sufficient to comprise from about 25 to about 40 wt % of the total weight of the confectionery composition; and
 cooling the cooked confectionery composition to form a confectionery composition containing fiber.

30. The process of claim 29 wherein the premix step further comprises up to about 10 wt % of a protein and wherein the ratio of reducing sugar to non-reducing sugar is from about 1:0.2 to about 1:1.

31. The process of claim 29 wherein the premix is cooked at a temperature of from about 220–270° F. (105–132° C.).

* * * * *